United States Patent
Classen et al.

(10) Patent No.: US 7,492,411 B2
(45) Date of Patent: Feb. 17, 2009

(54) METHOD OF AND APPARATUS FOR PROCESSING A VIDEO IMAGE

(75) Inventors: Brian J. Classen, Saskatoon (CA); Jordan C. Christoff, Santa Barbara, CA (US)

(73) Assignee: CNH Canada, Ltd. (CA)

( * ) Notice: Subject to any disclaimer, the term of this patent is extended or adjusted under 35 U.S.C. 154(b) by 617 days.

(21) Appl. No.: 11/136,683

(22) Filed: May 24, 2005

(65) Prior Publication Data

US 2005/0212928 A1    Sep. 29, 2005

Related U.S. Application Data

(62) Division of application No. 09/438,406, filed on Nov. 12, 1999, now Pat. No. 6,930,710.

(60) Provisional application No. 60/108,339, filed on Nov. 13, 1998.

(51) Int. Cl.
*H04N 5/235* (2006.01)
*H04N 5/222* (2006.01)

(52) U.S. Cl. ................................. 348/362; 348/372

(58) Field of Classification Search ............. 348/362, 348/367

See application file for complete search history.

(56) References Cited

U.S. PATENT DOCUMENTS

| | | | |
|---|---|---|---|
| 4,779,137 A | 10/1988 | Tojo et al. | |
| 5,111,301 A | 5/1992 | Haruki et al. | |
| 5,420,635 A * | 5/1995 | Konishi et al. | 348/362 |
| 5,767,904 A | 6/1998 | Miyake | |
| 5,929,908 A * | 7/1999 | Takahashi et al. | 348/364 |
| 5,969,761 A | 10/1999 | Takahashi et al. | |
| 6,184,940 B1 * | 2/2001 | Sano | 348/655 |
| 6,219,447 B1 | 4/2001 | Lee | |
| 6,496,226 B2 | 12/2002 | Takahashi et al. | |
| 6,618,091 B1 | 9/2003 | Tamura | |
| 6,621,519 B2 | 9/2003 | Nakayama et al. | |
| 6,995,790 B2 * | 2/2006 | Higurashi et al. | 348/218.1 |

FOREIGN PATENT DOCUMENTS

| | | |
|---|---|---|
| JP | 7-7669 | 7/1995 |
| JP | P200-224468 A | 8/2000 |

* cited by examiner

*Primary Examiner*—Lin Ye
*Assistant Examiner*—Hung H Lam
(74) *Attorney, Agent, or Firm*—Rebecca Henkel

(57) ABSTRACT

A color enhancement method for use in a video camera imaging system in the context of non-uniform lighting includes an adaptive algorithm for developing a shutter speed control signal, analog gain control signal and color balance signals from pixel luminance over one field of video. The control signals developed during one field are used to control the camera during the next field. The speed control signal and analog signal are determined based on the luminance signal obtained in digital form from the video camera, and analyzed over at least one field of video.

2 Claims, 5 Drawing Sheets

METHOD OF AND APPARATUS FOR PROCESSING A VIDEO IMAGE

CROSS REFERENCE TO RELATED APPLICATIONS

This patent application is a Divisional of, and claims priority to under 35 U.S.C. §120, U.S. patent application Ser. No. 09/438,406, filed on Nov. 12, 1999, now U.S. Pat. No. 6,930,710 entitled, "A Method Of And Apparatus For Processing A Video Image" and having Brian J. Classen and Jordan C. Christoff as the Inventors. The full disclosure of U.S. patent application Ser. No. 09/438,406 is hereby fully incorporated by reference.

FIELD OF THE INVENTION

The present invention relates to a method and apparatus for adjusting the contrast of a video image in a color video camera. More particularly, the invention provides for contrast adjustment with color gain adjustment in each filed of video so that consistent hue values are maintained between fields and the resulting image more closely approximates the dynamic range of the human eye.

BACKGROUND OF THE INVENTION

A Variety of discrimination systems, operating in a range of circumstances, use color analysis as a basic tool. An example can be found in agriculture, where a green area, such as a weed or other target plant, is to be detected within an area of another color, such as brown soil, in order to be sprayed. However, plant material on the ground, under natural, outdoor conditions, is not easily detected based on color detection if the detection equipment is a conventional video camera. The true color (hue) and brightness of objects may be altered in the video image, depending on the prevailing light level and on whether the object is in direct sunlight or in dark shade.

Color, as perceived by the human eye, can be described in terms of the three components lightness, hue and saturation as illustrated in FIG. 1.

Lightness L * is the perceptual human response to luminance Y, a CIE (Commission Internationale de L'Eclairage) quantity, defined as the radiant power weighted by a spectral sensitivity function that is characteristic of vision. Roughly speaking, areas appearing brighter that emit more light, have higher luminance Y. Lightness L * is related to luminance Y through the formula $$L*=116(Y/Y_n)^{1/3}-16; \ 0.008856<Y/Y_n$$

where $Y_n$ is the luminance of the white reference. Therefore, in practice, one can work with either quantity. In the 3-dimensional color space illustrated in FIG. 1, lightness L * varies from black to white.

Saturation is the colorfulness of an area judged in proportion to its luminance. Roughly speaking, the more the spectral power distribution (SPD) of a light source is concentrated at one wavelength, the more saturates will be the associated color. A color can be desaturated by adding light that contains power at all wavelengths. In FIG. 1, saturation is the length of the vector extending from the vertical axis.

HUE is the attribute of visual sensation according to which an area appears to be similar to one of the perceived colors, red, yellow, green and blue, of a combination of two of them. Roughly speaking, if the dominant wavelength of the SPD shifts, the hue of the associated color will shift. In FIG. 1, the hue is determined by the angle of the vector.

When capturing images, cameras can have their exposure and color balance settings adjusted. The exposure is adjusted in order to achieve a desired level of luminance. The color balance is adjusted so that the colors in the image are at their desired hues.

In the case of a video camera using a charge coupled device (CCD) as the image sensor, the exposure may be adjusted by adjusting the shutter speed and/or the analog gain. Shutter speed refers to the amount of time which the image sensor is exposed to the image. In a typical CCD application, the shutter speed is controlled electronically by controlling the number of overflow drain pulses (OFD) applied to the sensor to discharge the accumulated charge in the individual CCD pixel sites.

Analog gain refers to the gain of the analog amplifier immediately after the CCD. The signal output from a CCD is an analog signal; comprising of a reference voltage and a readout voltage for each pixel site. The first stage of processing the video signal output from the sensor is to determine the difference between the reference and readout voltage, and then amplify the difference signal for subsequent processing.

By adjusting the settings for shutter speed and analog gain, the luminance level of pixels in the output signal can be brought in a range optimum for signal processing. The absolute values of the luminance voltage levels at specific colors and intensities are defined by international standard. To ensure accurate signal processing, it is desired to maintain the luminance levels in the midrange of a workable range having an upper limit Max Level (FIG. 6A) and a lower limit Min Level so that noise at a low levels and overflow at high levels does not interfere with the processing.

The color balance is adjusted by adjusting the color gains in the digital signal processor (DSP) of a conventional camera. The color gains are adjusted at their desired levels so that the overall image color, when viewed on a vector scope, is centered around white.

Consider the case where a scene is illuminated with a steady light source and the scene is captured by a conventional color camera with two different shutter speeds. Two slightly different images are obtained. The luminance levels of the two images are different since they were captured with different shutter speeds. The saturation levels of the two images are also different, as saturation depends on lightness, and thus on luminance. However, the hues of the colors in both images should be identical, since the color makeup, the SPD, of the two images is the same, as determined by the steady light source.

Consider now the case were two images of a scene are captured using a different light source for each image, but the same shutter speed and color gain settings in the camera are maintained. The two images are different as the luminance and saturation levels are different. In addition, the hues are different in the two images because the color makeup of the incident light is different is each case, and the same color gain settings have been used for each image.

A standard approach to adjusting the video image to the scene being captured is to adjust the shutter speed of the CCD, and to adjust the analog gain of the CCD output signal, so that the analog output signal is within a desired range of operation. In situations where there is a large contrast between the darkest and brightest areas, the resulting image will either have areas which appear darker in the video image than they actually are, or areas which appear overexposed and brighter than they actually are.

There are prior art video camera systems that try to compensate for non-uniform lighting. Some of these systems use adaptive exposure algorithms that determine two different shutter speeds and/or analog gain settings, for alternating fields of video, targeting bright areas and dark areas, respectively. Typically, these video camera systems use the same color gain settings for each field of video. As a result, the hue values between alternating fields of video are inconsistent.

SUMMARY OF THE INVENTION

An object of the present invention to provide a technique for enhancing the color information in a video image of a scene while adjusting the contrast of the image, the scene being illuminated with varying or no-uniform lighting.

According to the present invention, there is provided a method for processing a video image in a video camera having exposure and color balance adjustment means, the method comprising the step of adjusting the exposure and color balance settings on alternate fields of video.

A further object of the invention is to provide a method of, and apparatus for, processing a video image in a video camera having shutter speed, analog gain and color balance adjustments means, the method comprising the steps of: a) obtaining a luminance signal from the video camera, in a digital format; b) analyzing the luminance signal over a first field of video; c) determining, based on the analyzed luminance signal, a first set of control signals including a first shutter speed control signal and a first analog gain signal, the first set of control signals causing the luminance of a majority of pixels in a field video to be below a first limit defining a workable range of luminance; d) determining, from the first set of control signals, a first set of color balance settings; e) during a second field of video, applying the first shutter speed control signal, the first analog gain signal and the first set of color balance settings to the shutter speed, analog gain and color balance adjustment means, respectively; f) analyzing the luminance signal over the second field of video; g) determining, based on the analyzed luminance signal, a second set of control signals including a shutter speed control signal and a second analog gain signal, the second set of control signals casing the luminance of a majority of pixels in a field video to be above a second limit defining the workable range of luminance; h) determining, from the second set of control signals, a second set of color balance settings; and, i) during the next field of video, applying the second shutter speed control signal, the second analog gain signal and the second set of color balance settings to the shutter speed, analog gain and color balance adjustment means, respectively.

According to the method the invention the color information from a video image of a scene with non-uniform lighting is enhanced us an adaptive algorithm providing variable sets of adjusting values for setting the exposure and color balance settings of the camera on succeeding fields of video. The settings for one field are determined based on the luminance signal analyzed over the preceding field of video. One set of settings targets dark areas of image and the other set targets the bright areas of the image. The two sets are used on alternate fields of video so that over two fields a pixel has the correct color information in at least one field. Every pixel is within the workable range of luminance in at least one field, over the two fields, due to the exposure settings. Furthermore, consistent hue values are maintained between alternate fields, as the color balance settings for the fields are adjusted according to the exposure settings, thus to the luminance level for each field.

In one embodiment, an apparatus according to the invention comprises a color video camera, a histogram counter for examining the luminance output signal of the camera over a field of video, a pixel color detection circuit, and a micro controller responsive to the histogram counter for generating sets of exposure control and color balance signals that are applied to the camera and color offset signals that are applied to the pixel color detection circuit. The pixel color detection circuit may include means for identifying pixels of color corresponding to a color region of interest. In a second embodiment of the invention, the histogram counter, and at least a portion of the pixel color detection circuit comprise circuits within a conventional video camera.

According to a further aspect of the invention, a pixel color detection circuit examines each pixel of a video image to determine whether it is in color region of interest. The pixel color detection circuit uses a color offset signal, calculated by a controller based on the luminance signal. The color offset signal indicates how far from neutral, or white, in the chosen color space, is the chrominance data from the camera.

The invention may be used to advantage on agricultural sprayers having a video camera for detecting green weeds which are then sprayed with chemicals from nozzles disposed near the camera.

Other objects, advantages and features of the invention will be readily apparent to those skilled in the art upon consideration of the following detailed description and the accompanying drawings.

DETAILED DESCRIPTION OF THE INVENTION

Figure 2:
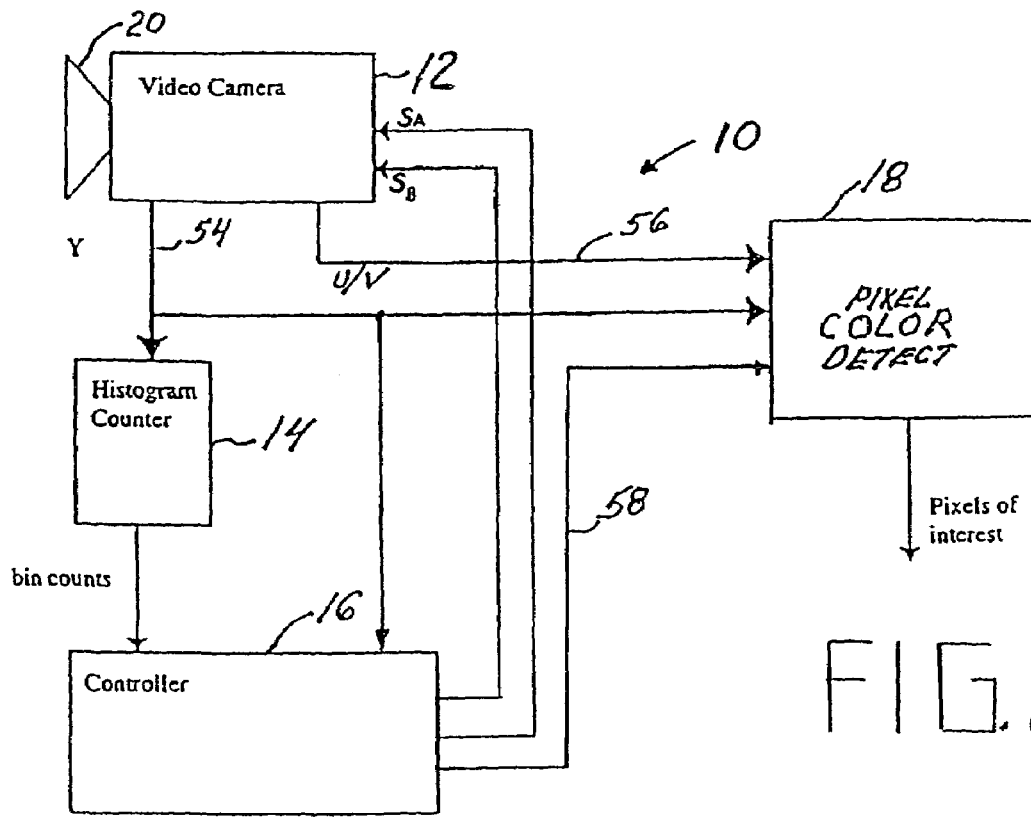
FIG. 2 is a block diagram of a system in accordance with one embodiment of the invention.

Referring to FIG. 2, a video system 10 according to the invention comprises a CCD color video camera 12, a histogram counter 14, a micro controller 16 and a pixel color detection circuit 18.

Figure 3:
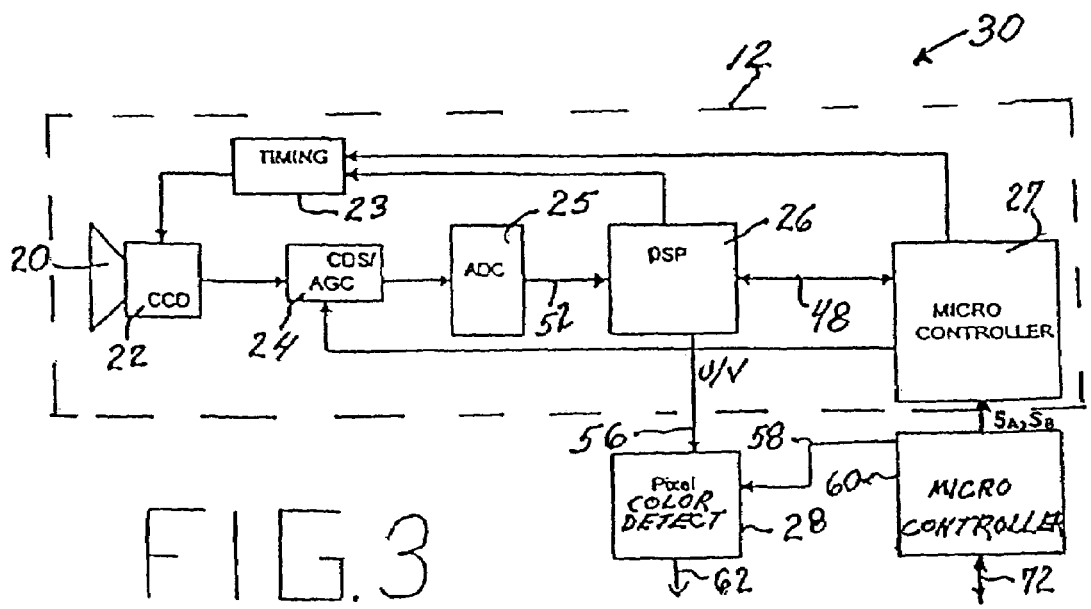
FIG. 3 is a block diagram of a system in accordance with another embodiment of the invention and illustrating major components of the video camera shown in FIG. 1.
Figure 4:
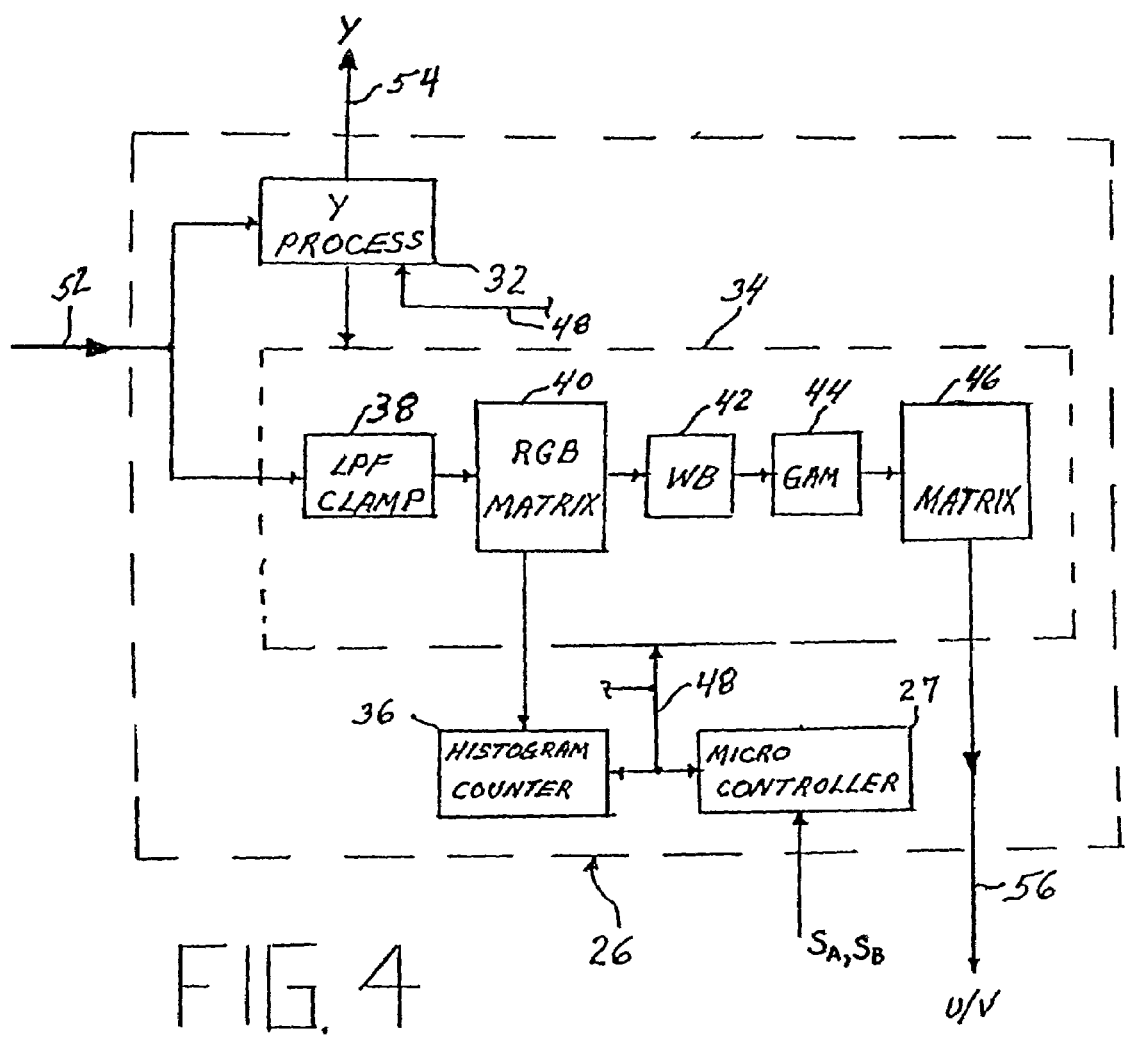
FIG. 4 is a block diagram of circuits contained within the digital signal processor shown in FIG. 3.

Camera 12 is a well-known Sony camera and will first be described to provide background for understanding the invention. As shown in FIG. 3, camera 12 comprises a lens 20 for imaging a scene on a Charge Coupled Device (CCD) sensor 22, a timing control and driver circuit 23, a Correlated Double Sampling and Analog gain Control circuit (CDS/AGC) 24, an analog to digital converter (ADC) 25, and a Digital Signal Processor (DSP) 26. For clarity in explaining the invention, a micro controller 27 is shown separately in FIG. 3 but in actual practice this micro controller in implemented within DSP 26 as shown in FIG. 4.

Timing control and driver circuit 23 may be a model CXD2408R chip commercially available from Sony Corporation. Circuit 23, in response to commands from micro controller 27, sets the camera exposure or shutter speed by controlling the duration of overflow drain pulses applied to sensor 22 and also controls the readout from the sensor. The analog video output from sensor 22 is applied to CDS/AGC circuit 24 which may be a Sony model CXA2006Q chip. the processed and gain controlled analog output signal form CDS/AGC 24 is then applied to the ADC 25. ADC 25 converts the analog signal into 8-bit digital video signals, each signal corresponding to a pixel position on sensor 22.

The output signals from ADC 25 are applied to DSP 26 which may be a Sony model CXD2163R digital signal processor chip. As shown in FIG. 4, DSP 26 includes luminance (Y) processing circuits 32, chrominance processing circuits 34, and a histogram counter 36, in addition to the micro controller 27.

The chrominance processing circuits 34 include a low pass filter and clamp circuit 38, a red/green/blue (RGB) matrix 40, white balance (WB) circuit 42, a gamma correction circuit 44 and a transformation matrix 46. A DSP bus 48 connects micro controller 27 to the Y processing circuits 32, histogram counter 36 and various components within the chrominance processing circuits 34 so that the micro controller may control various functions performed within the DSP.

Briefly, the digital video output of ADC 25 is applied via path 52 to the luminance processing circuit 32 and the chrominance processing circuit 34. The luminance processing circuit produces the luminance signal Y which is available at an output port 54. In the chrominance processing circuit 34, the video signal is applied to the low pass filter and clamp circuit 38 having an output connected to the RGB matrix 40. This matrix transforms the video signal into luminance and red, green, and blue component values or signals. After processing in white balance circuit 42 and gamma correction circuit 44, the signals are applied to a transformation matrix which transforms the signals into color difference signals B-Y (or U0 and R-Y (or V) which are available at an output port 56. The matrix 46 produces one digital color difference signal (U or V) concurrently with each digital luminance signal Y produced by luminance processing circuit 32, the color difference signals alternating between U and V.

Returning now to FIG. 2, the luminance signal Y produced by DSP 26 in FIG. 4 is applied a histogram counter 14 for analysis. The histogram counter 14 has an 'over-limit' bin and an 'under-limit' bin programmable by controller 16 to count pixels having luminance over or under respective luminance thresholds set by controller 16 and defining the workable luminance range. The bins are used alternately. One bin is used to count the number of pixels in a first field of video having a luminance above a first threshold or high limit and the other bin is used during the next field of video to count the number of pixels having a luminance below a second threshold or low limit. A field of video is defined as the capture of one vertical cycle of the CCD sensor in the video camera.

The histogram bin counts produced by histogram counter 14 are utilized by controller 16 to develop two sets of camera control signals, $S_A$ and $S_B$ designed to bring the luminance of as many pixels as possible (about 90% in actual practice) within the workable luminance range. Each set of control signals includes a shutter speed control signal and an analog gain setting signal. These signals are transferred to the camera micro controller 27 (FIG. 3) which in turn controls the timing and shutter speed control circuit 23 and analog gain circuit 24 within camera 12. The signals of set $S_A$ are intended to keep the majority of pixel values above the minimum level of the workable range of luminance whereas the signal of set $S_B$ are intended to keep the majority of pixels below the maximum level of the workable range of luminance.

Figure 5:
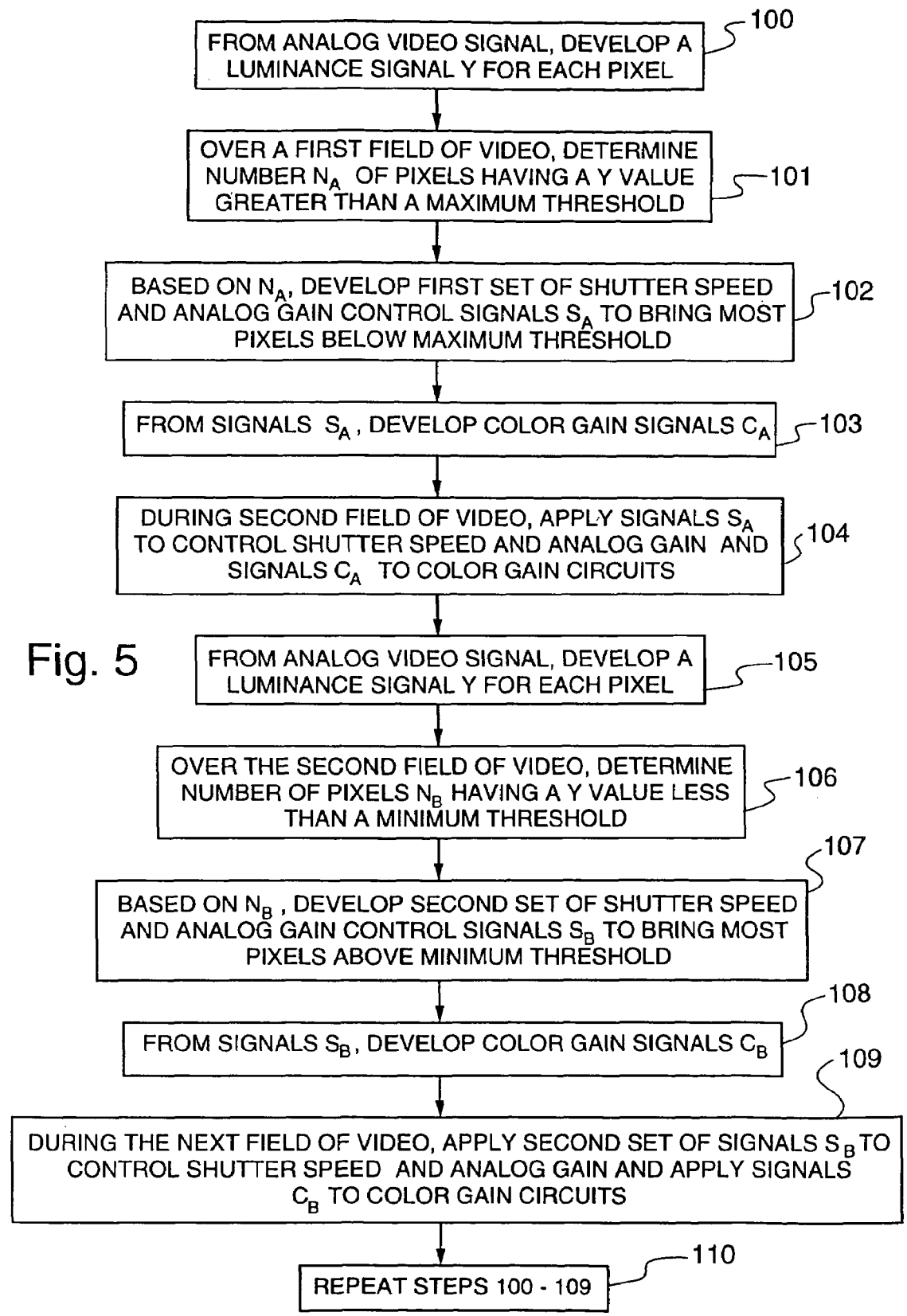
FIG. 5 is a flow diagram illustrating the steps of a method in accordance with the present invention.
Figure 6A:
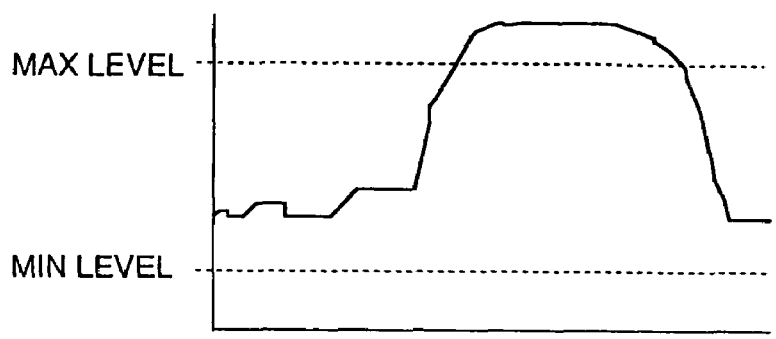
FIGS. 6A and 6B are waveform diagrams illustrating adjustment of a video signal on alternate video fields to bring the majority of pixel luminance values below the upper limit of a workable range; and, FIGS. 6C and 6D are waveform diagrams illustrating adjustment of a video signal on alternate video fields to bring the majority of pixel luminance values above the lower limit of a workable range.

The method of color enhancement according to the invention is illustrated in FIG. 5. At step 100 the analog video signal is processed over a field of video to develop a digital luminance signal Y for each pixel of a field. At step 101 the over-limit bin of the histogram counter counts the number of pixels in a first field having a luminance greater than Max Level as illustrated in FIG. 6A. At the end of the first field, controller 16 samples the over-limit bin count and develops (at step 102) the set of control signals $S_A$.

At step 103 a set of color gain signals $C_A$ are developed, as later explained, from the set of signals $S_A$.

Figure 6B:
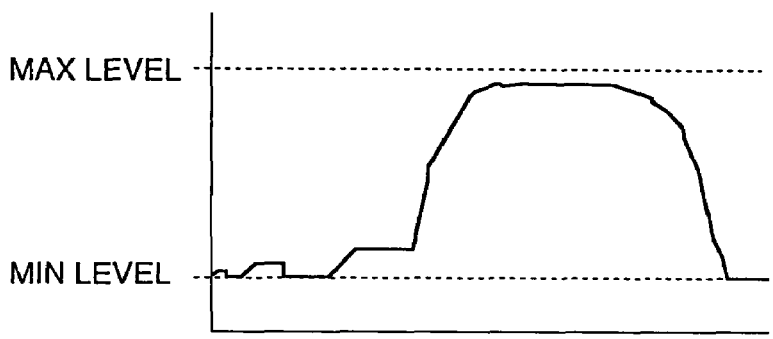

At step 104, the sets of signals $S_A$ and $C_A$ are applied to the camera to control shutter speed, analog gain and color gain during a second field of video. During the second field, the set of signals $S_A$ control the camera to bring the luminance of most pixels below the max level, as shown in FIG. 6B.

Figure 6C:
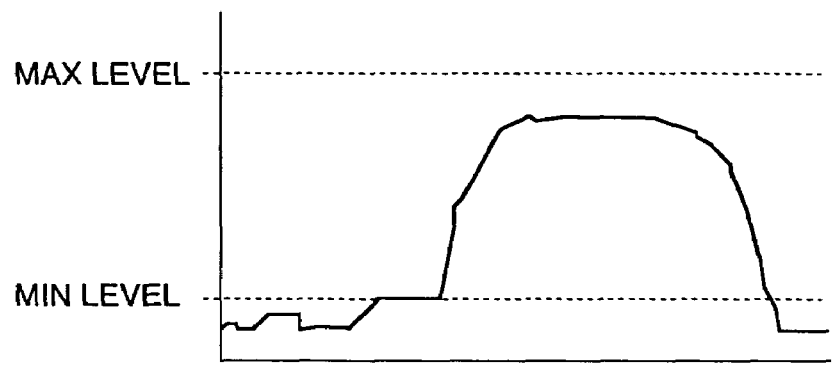

The analog video signal for the second field is processed at step 105 to develop a digital luminance signal Y for each pixel and during the second field the under-limit bin of the histogram counter counts (step 106) the number of pixels having a luminance less than Min Level shown in FIG. 6C. At the end of the second field the controller 16 samples the under-limit bin count and develops (at step 107) the set of controls signals $S_B$ which are utilized to control the camera during the next video field.

Figure 6D:
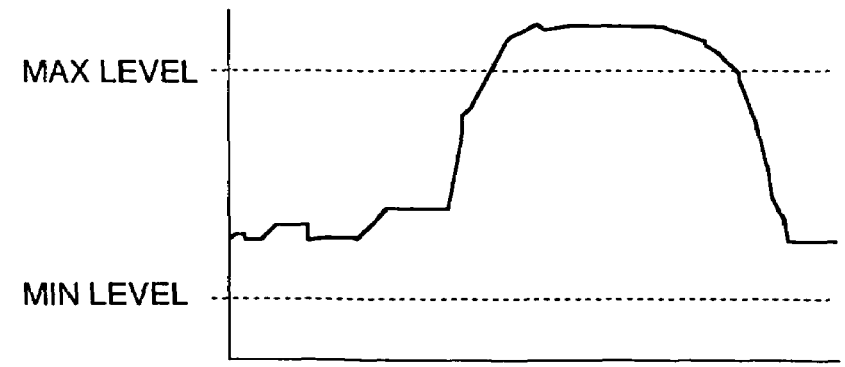

Step 108 develops a second set of color gain signals $C_B$. At step 109, the sets of signals $S_B$ and $C_B$ are applied to the camera to control the shutter speed, analog gain and color gain during the next field. The signals $S_B$ control the shutter speed and analog gain to bring the luminance of most pixels above the min level as shown in FIG. 6D.

Steps 100-109 are then repeated (step 110) so that over any two consecutive fields of video the luminance of most of the pixels is brought within the workable range in at least one of the two fields. One field is optimal for the darker areas of an image and the other field is optimal for the brighter areas. Furthermore, because the color gain settings are adjusted according to the luminance level for each field, a consistent hue value is maintained between the two fields. By combining the information in the alternate fields, the true color of each pixel in the image can be more accurately determined.

As mentioned above, controller 16 also alternately generates a set of color gain signals $C_A$ based on the signals of set $S_A$ or a set of color gain signals $C_B$ based on the signals of set $S_B$. The color gain signals $C_A$ or $C_B$ are transmitted to camera micro controller 27 (FIG. 3) with the sets of signals $S_A$ or $S_B$, respectively. Within the camera, micro controller 27 utilizes the color gain signals to set color gains within the white balance circuit 42 (FIG. 4). A look-up table may be used to determine the color gain signal values for each set of shutter speed and analog gain settings.

The controller 16 also generates a color offset signal for use by the pixel color detection circuit 18. The color offset signal indicates to the pixel color detection circuit 18 how far away from the neutral, in the chosen color space, is the chrominance data U/V produced by the matrix 46 (FIG. 4). At different color temperatures of incident light, the chrominance data U/V from the camera 14 varies with respect to its neutral, or white position and the color offset signal provides compensation for this effect. The controller 16 has therein a luminance integrator and a table of color offset values (not shown). The luminance signal is integrated over one field and used to develop and address for addressing the table to obtain the color offset signal which is relayed to the color detection circuit 18 in the interval between successive fields. One method of determining the color offset signal based on the total luminance is to use a linear equation, y=mx+b, where the y is the color offset original, x is the total luminance, and m and b are experimentally determined based on the color region of interest. The values are implementation dependent. In another method, a look up table could be used instead of the equation. Other methods may be used.

Figure 1:
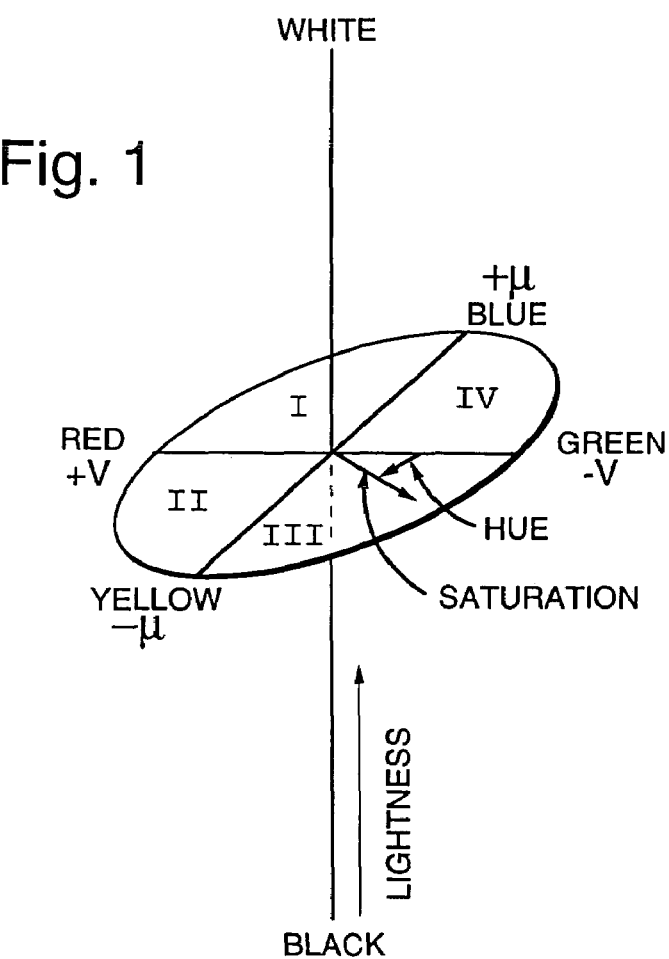
FIG. 1 is a description of the organization of color-perception space in cylindrical coordinates, in terms of hue, lightness and saturation.
Figure 7:
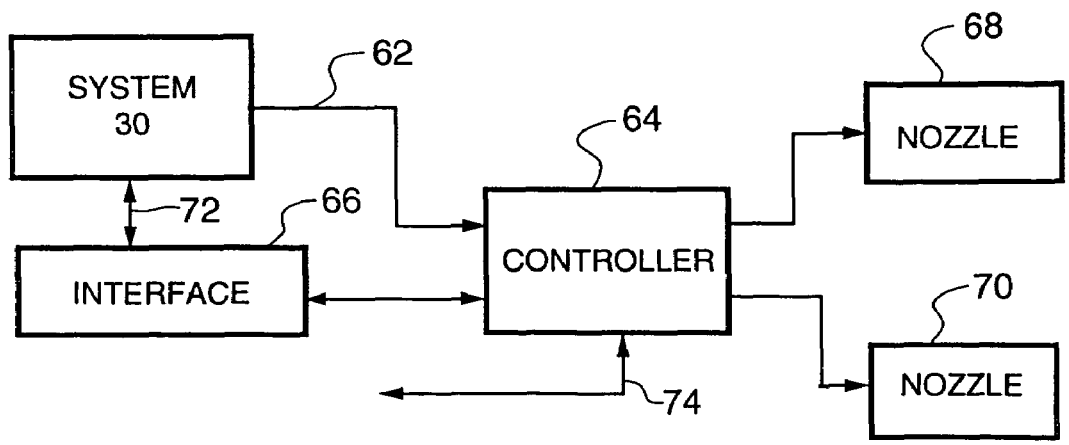
FIGS. 7 a block diagram of system and controller with nozzles.

The pixel color detection circuit 18 examines each pixel signal from the camera 12 to determine whether the pixel is in the color region of interest. The following scenario is provided as an example. Consider that one needs to identify all blue pixels. In the UV color space shown in FIG. 1, blue can be approximated as the region defined by U>0 and V<0, where 0 falls on the lightness axis. This holds true when the color gain in the camera is perfectly tuned to match the incident light color temperature and white is in the centre of the space, i.e. it is represented by U=0 and V=0. The color offset signal from the controller 16 is used to compensate for the case where the color gain is not perfectly matched. The color offset signal is represented by its two components in the UV space, blue_offset and red_offset. The blue region is defined by U>blue_offset and V<red_offset. Using this equation, the pixel color detection circuit 18 can detect the blue pixels in a field video.

Our concurrently filed application referenced above describes in detail different embodiments of the pixel color detection circuit 18 and how it is utilized to detect green weeds for the purpose of spraying them with a chemical agent. In its simplest embodiment, circuit 18 comprises gain circuits for maximizing the color difference signal U or V in the color region of interest while minimizing all other signals. For example, since green is defined by negative values of V are maximized in order to detect green weeds. In other words, the gain of the color difference signal V is maximized for quadrants III and IV (FIG. 1) and minimized for quadrants I and II, the color difference signal U being minimized for all quadrants. The negative values of V are then comprised to a threshold value to determine if the value of V is negative enough to be considered green.

An operator may select, via controller a particular color of pixels to be detected. Depending on the color selected, the controller selects a threshold value, for example, the negative value the V axis signal must have to be considered green. This threshold value is modified by the color offset signal (red_offset when green pixels are being detected) and the resulting value is used as the threshold which is compared to negative signals to determine if pixels are green.

Since the hue vector (see FIG. 1) for green is actually displaced approximately 30° from the negative V axis toward the negative U axis, circuit 18 may, in some embodiments, include a transformation circuit for rotating the color difference signals U counterclockwise approximately 30° so that the green information in the U signals may also be used to more accurately detect green pixels.

In FIG. 2, the histogram counter 14, controller 16 and pixel color detection circuit 18 are all external of the video camera. The video camera shown in FIGS. 3 and 4 includes circuits permitting some of the functions of controller 16 using the histogram counter 36. The transformation matrix 46 includes gain circuits controllable by micro controller 27 hence the function of maximizing of the negative V signal may done in matrix 46 rather than in pixel color detection circuit 18. The matrix 46 is also controllable by micro controller 27 to rotate the color difference signals so the function of rotating the color difference signal approximately 30° may also be performed in the matrix rather than in circuit 18.

the function of comparing the maximized negative V signal with a threshold to determine if it is green cannot be performed in the camera 12 so a pixel color detector circuit 28 is provided to perform this function. A micro controller 60, connected to the camera micro controller 27 by a conventional interface circuit (not shown) is still required to permit operator entry of the pixel color interest.

FIG. 5 illustrates an application of the present invention to agricultural sprayers and more particularly to weed detection spraying. The output of system 30 (FIG. 5), specifically the output of the pixel color detection circuit 28, is connected to a nozzle micro controller 64. Detection circuit 28 is a programmable logic array. In addition to comparing for target color (green) circuit 28 counts the umber of pixels of the target color occurring on each video scan line. Spray controller 64 samples the outputs from section circuit 28 for the purpose of controlling two spray nozzles 68 and 70.

Controller 64 also receives data via a CAN bus 74. This information includes a nozzle turn-on time, a nozzle turn-off time and a threshold value (weed size) representing the minimum number of green pixels per scan line, per region, that must be detected in order to actuate a spray nozzle. In this regard, a sprayer may spray a path having a width of 30 feet or more, is provided with a plurality of cameras. Each camera is aimed do as to view a different portion of the path to be sprayed. The field of view of each camera is divided into two regions and two nozzles 68, 70 are provided for spraying a respective region. Controller 64 utilizes the green/not green signal from detector circuit 28 to determine, for each scan line, how many green pixels have been detected within each region. If the number of green pixels within a region exceeds the threshold value (weed size) input by an operator via CAN bus 74, then the controller 64 produces a signal to activate the nozzle for that region when the nozzle is over the detected weed.

The camera is in front of the nozzles ad a nozzle is turned on only when it is over a weed. Circuits (not shown) measure the forward progress of the sprayer and develop turn-on and turn-off times based on the progress of the sprayer and the camera to the nozzle distance.

It will be understood that a keyboard or control panel is linked to CAN bus 74 permit an operator to enter the threshold value defining weed size. Operator selection of the color pixels to be detected is entered via the same keyboard and is relayed to controller 72 via controller 64 and a serial communication circuit 66.

The functions of controllers 60 and 64 may be carried out in a single micro controller rather than two. Numerous other modifications, variation and adaptations may be made to the particular embodiments of the invention described above without departing from the scope of the invention, which is defined in the claims.

We claim:

1. A method of processing a video image in a video camera having exposure and color balance adjustment means, the method comprising the step of:
   providing a variable set of adjusting values for setting the exposure and color balance settings of the camera on succeeding fields of video;
   analyzing the settings for one field based on luminance signal from a preceeding field of video;
   adjusting the exposure settings on alternate fields of video, so that one set of settings on field targets objects in dark areas of the image and an alternate set of field targets objects in bright areas of the image;

providing the set of setting on field targets objects in dark areas and the alternate set of field targets objects in the bright areas of the image are maintained on alternate fields of video wherein that over two fields a pixel has the correct color information in at least one field; and, adjusting the color balance for each field based on the exposure setting for that field.

2. A method of processing a video image signal in a color video camera having shutter speed and exposure and analog gain and color balance adjustment means, the method comprising the steps of:

a) deriving a digital luminance signal for said analog video image signal;

b) analyzing the luminance signal over a first field of video;

c) determining, based on the analyzed luminance signal, a first set of control signals including a first shutter speed control signal and a first analog gain signal, the first set of control signals causing the luminance of a majority of pixels in a field video to be below a first limit defining a workable range of luminance, d) determining, from the first set of control signals, a first set of color balance settings;

e) during a second field of video, applying the first shutter speed control signal, the first analog gain signal and the first set of color balance settings to the shutter speed, analog gain and color balance adjustment means, respectively;

f) analyzing the luminance signal over the second field of video;

g) determining, based on the analyzed luminance signal, a second set of control signals including a second shutter speed control signal and a second analog gain signal, the second set of control signals causing the luminance of a majority of pixels in a field of video to be above a second limit defining the workable range of luminance;

h) determining, from the second set of control signals, a second set of color balance settings;

i) during the next field of video, applying the second shutter speed control signal, the second analog gain signal and the second set of color balance settings to the shutter speed, analog gain and color balance adjustment means, respectively;

j) providing a variable set of adjusting values for setting the exposure and color balance settings of the camera on succeeding fields of video;

k) analyzing the settings for one field based on luminance signal from a preceeding field of video;

l) adjusting the exposure settings on alternate fields of video, so that one set of settings on field targets objects in dark areas of the image and an alternate set of field targets objects in bright areas of the image;

m) providing the set of setting on field targets objects in dark areas and the alternate set of field targets objects in the bright areas of the image are maintained on alternate fields of video wherein that over two fields a pixel has the correct color information in at least one field; and, n) adjusting the color balance for each field based on the exposure setting for that field.

* * * * *